Patented Sept. 7, 1943

2,328,633

UNITED STATES PATENT OFFICE 2,328,633

SOLVENT COMPOSITION

Peter B. Evans, Wynnewood, Pa., assignor to E. I. du Pont de Nemours & Company, Wilmington, Del., a corporation of Delaware No Drawing. Application June 1, 1940, Serial No. 338,369

7 Claims. (Cl. 106—265)

This invention relates to solvent compositions and more particularly to solvent compositions for use in resin enamel coating compositions.

Various products such as automobile bodies, refrigerator cabinets, utility metal cabinets, etc. originally finished with decorative and protective synthetic finishes are frequently refinished after a period of service. This refinishing may be for various reasons as a desire to change the color of the finish, renew the general appearance of the product, or for protection of worn or damaged portions of the surface. The refinishing of such products is usually carried out in small establishments where the conditions of temperature and humidity are not easily controllable and may vary over a wide range both in winter and in summer weather. For the refinishing, synthetic resin enamels as alkyd resin enamels are usually used, and these are usually of the air drying type. These enamels are usually supplied to the refinisher in such form as to require dilution with a solvent to a viscosity suitable for spraying. In the present state of the art difficulty is often encountered in producing a uniformly satisfactory finish due, as previously noted, to the wide variation in temperature conditions particularly in the winter season. The difficulties are mainly of two kinds (a) too slow drying producing an unsatisfactory film on which dust and dirt may settle before the coating is dry and (b) a rough and uneven film due to the wrinkling of the coating during the drying. The former usually occurs where the temperature is too low and the latter where the temperature is too high or where the drying is forced. The proper drying of such synthetic resin enamels is in a large measure controlled by the use of the proper solvents or solvent mixture. To obtain such a solvent or solvent mixture which will yield satisfactory results over a wide range of drying conditions has not heretofore been practical in the art. Means have now been found to overcome the difficulties and deficiencies of the present state of the art and to make an advance therein with respect to the production of uniformly satisfactory synthetic resin enamels air dried over a rather wide temperature range.

The difficulties described above are encountered not only in so-called refinishing art but also in the initial finishing or application of decorative and protective coating compositions to articles of various kinds as previously noted.

This invention has as an object the provision of solvent compositions for air drying fatty oil modified alkyd resin enamels. Another object is the provision of solvent compositions for air drying fatty oil modified alkyd resin enamels which will produce satisfactorily smooth coatings substantially free from surface imperfections or blemishes by drying in a minimum time over a rather wide range of temperature conditions. A still further object is the provision of oil modified alkyd resin enamels containing such solvent compositions. Other objects will be apparent as the description of the invention proceeds.

These objects are accomplished by the use of a solvent composition as a diluent for the normally supplied enamels, such solvent compositions comprising aliphatic or aromatic liquid hydrocarbons and a substantial amount of tetrahydronaphthalene, the tetrahydronaphthalene being such as gives at least a minimum value as obtined by a test procedure hereinafter described.

Tetrahydronaphthalene is known to absorb oxygen on exposure to air and to form peroxides. Difficulty with this formation of peroxides is also encountered in the preparation of the tetrahydronaphthalene, and their presence is not desirable for the ordinary solvent uses of the material. In the preparation of the tetrahydronaphthalene special precautions should therefore be observed to avoid or minimize the formation of the peroxides since they add to the unreliability of its use.

As previously noted the hydrogenated naphthalene adsorbs oxygen when exposed to the air and thus forms peroxides. Peroxide formation may be accelerated by passing a stream of air or oxygen gas through the liquid hydrocarbon. The amount of peroxide formed will, of course, depend on the time and other conditions of treatment.

It has been found that what may be termed the "peroxide activity" of the tetrahydronaphthalene may be determined by a test procedure in which the rise in temperature is determined when a metal drier is added to the so-called "activated" hydrocarbon. This test is carried out in the following manner:

One hundred cubic centimeters of the "activated" tetrahydronaphthalene are placed in a suitable calorimeter. The solvent is permitted to reach thermal equilibrium. After this point is reached the temperature is read and recorded. To this is then added 3 cc. of a solution of cobalt naphthenate in mineral spirits containing approximately 2% of metallic cobalt used on the amount of solution used.

The temperature of the liquid mixture then rises and when the maximum temperature is reached it is noted and recorded. The difference in the two readings expressed on the centigrade scale, is designated as "degrees test" of the tetrahydronaphthalene and is considered as a measure of its relative activity. The time required for the liquid to reach the maximum temperature will vary with its "activity," but will usually range from approximately 5 minutes to 1 hour. The "degrees test" may vary over quite a range as from 0° for non-reactive material or material substantially free of peroxides to 50° or higher for highly active material.

The present invention will be more fully understood from the following examples in which the parts are by weight:

EXAMPLE I

| | Parts |
|---|---|
| "Active" tetrahydronaphthalene | 25 |
| High solvency petroleum naphtha | 75 |

The high solvency petroleum naphtha used had a boiling range of approximately between 95° C. and 135° C.

EXAMPLE II

| | Parts |
|---|---|
| "Active" tetrahydronaphthalene | 10 |
| Toluol | 45 |
| V. M. & P. naphtha | 45 |

EXAMPLE III

| | Parts |
|---|---|
| "Active" tetrahydronaphthalene | 5 |
| High flash naphtha | 95 |

EXAMPLE IV

| | Parts |
|---|---|
| "Active" tetrahydronaphthalene | 40 |
| V. M. and P. naphtha | 60 |

The solvent composition may contain any suitable liquid aliphatic, aromatic, or aliphatic-aromatic hydrocarbon or mixtures thereof and the so-called "active" tetrahydronaphthalene having a minimum "degrees test" value determined as previously described. The amount of "active" tetrahydronaphthalene in the solvent composition may conveniently vary from approximately 3% to approximately 40% by weight. Amounts of less than substantially 3% are ineffective for the purpose intended and amounts above approximately 40% introduce objectionable working properties to the enamels in which they are used and further increase the cost of the compositions to the point of diminishing returns.

As previously indicated the "active" tetrahydronaphthalene used must possess a minimum "degrees test" value of 1°. This value may be as high as 50° although for all practical purposes it has been found that "active" tetrahydronaphthalene with a "degrees test" value from 3° to 15° is preferred. The "degrees test" value may be determined on the mixed solvents (as shown in the examples above) in which instance a range value of from 0.5° to 10° has been found to be satisfactory, with a preferred range of from 1° to 6°.

The solvents as described in the examples above are used to dilute to the desired and proper working consistency alkyd resin enamels as used in the refinishing industry, etc. The following examples will illustrate suitable enamels and materials satisfactory for application after dilution with the solvent mixtures containing the "active" tetrahydronaphthalene.

EXAMPLE V

Black enamel

| | Parts |
|---|---|
| Carbon black pigment | 2.5 |
| Alkyd resin (solids) | 35.0 |
| Cobalt naphthenate solution | 2.0 |
| Manganese naphthenate solution | 1.3 |
| Lead naphthenate solution | 1.7 |
| Hydrocarbon solvent | 57.5 |

The cobalt, manganese and lead naphthenate solutions were prepared by dissolving the metallic naphthenate in mineral spirits so that the solutions contained 2%, 3% and 16% metal, respectively.

The above formula represents the enamel of a consistency as shipped to the consumer. In order to prepare the material for practical application, e. g., by spraying, this composition is ordinarily diluted with from 10 to 25% of one of the solvent compositions of Examples I—IV. Such a composition applied to a suitably prepared surface would produce a satisfactorily smooth coating substantially free from surface imperfections and would dry in a minimum time even if applied under conditions of a wide temperature range. On the other hand, when the above composition is diluted with a hydrocarbon solvent composition containing no "active" tetrahydronaphthalene and the composition applied to a suitably prepared surface, the type of coated surface obtained will be largely dependent on the temperature of the drying atmosphere. If the temperature is too high, the coating will not be smooth and free from surface imperfections and blemishes as wrinkles, etc. If the temperature is too low the drying time will be unduly prolonged with a probably resultant rough surface due to the accumulation of dust, dirt, etc., from the surrounding atmosphere.

EXAMPLE VI

White enamel

| | Parts |
|---|---|
| Titanium oxide pigment | 21.0 |
| Fatty oil modified alkyd resin (solids) | 29.0 |
| Cobalt naphthenate solution | 1.0 |
| Lead naphthenate solution | 1.0 |
| Hydrocarbon solvent | 48.0 |

The drier solutions were as described under Example V. This composition is also of the consistency as shipped to the consumer. For practical application purposes the enamel is thinned with 10–25% of the hydrocarbon solvent containing the "active" tetrahydronaphthalene. The results obtained from the use of this enamel were similar to those described under Example V.

EXAMPLE VII

Yellow enamel

| | Parts |
|---|---|
| Chrome yellow pigment | 18.0 |
| Fatty oil modified alkyd resin (solids) | 30.5 |
| Cobalt naphthenate solution | 1.0 |
| Lead naphthenate solution | 1.0 |
| Hydrocarbon solvent | 49.5 |

This enamel is used as described under Examples V and VI.

The above examples of enamels are so-called single pigment enamels. So-called multi-pigment enamels are included as well in the purview of the present invention. Various fatty oil or fatty oil acid alkyd resins may be used in preparing such enamels. The proper choice of the alkyd resin to be used will be readily apparent to those skilled in the art.

The present invention is characterized by the provision of liquid hydrocarbon solvent compositions comprising "active" tetrahydronaphthalene, aliphatic, aromatic or mixtures thereof and alkyd resin enamels containing such solvent compositions, the tetrahydronaphthalene having a minimum "degrees test" value of 1°.

While the solvent and enamel compositions have been described with reference to fatty oil or oil acid modified alkyd resins the invention is applicable, with equally satisfactory results, to oleoresinous compositions and other synthetic oxidizable resins used in preparing air drying coating compositions.

It is apparent that many widely different embodiments of this invention may be made without departing from the spirit and scope thereof, and therefore, it is not intended to be limited except as indicated in the appended claims.

I claim:
1. An enamel containing an air-oxidizable film-forming ingredient and a solvent mixture comprising hydrocarbon solvent and air-oxidized tetrahydronaphthalene having a minimum "degrees test" value of from 1° to 50°.
2. The solvent of claim 3 in which the "degrees test" value is from 3° to 15°.
3. A solvent for enamels which comprises tetrahydronaphthalene which has been activated by passing a stream of oxygen through the liquid hydrocarbon until its "degrees test" is between 1° and 50°.
4. The enamel of claim 1 in which the film-forming ingredient is a modified alkyd resin.
5. The enamel of claim 1 in which the film-forming ingredient is an oil having drying properties.
6. The enamel of claim 1 in which the film-forming ingredient is a synthetic oxidizable resin.
7. A solvent mixture comprising active air-oxidized tetrahydronaphthalene having a "degrees test" between 1° and 50° and being present in the solvent mixture in amount between about 3 and 40% by weight.

PETER B. EVANS.